United States Patent [19]

Klasson

[11] 4,194,107
[45] Mar. 18, 1980

[54] WELDING TIP

[76] Inventor: George A. Klasson, 4430 Azalea La., North Olmsted, Ohio 44070

[21] Appl. No.: 802,825

[22] Filed: Jun. 2, 1977

[51] Int. Cl.$^2$ ............................................... B23K 9/24
[52] U.S. Cl. .................................... 219/75; 219/145.1
[58] Field of Search ..................... 219/75, 145, 145.21, 219/146.21, 121 P; 279/1 A, 102

[56] References Cited

U.S. PATENT DOCUMENTS

| | | | |
|---|---|---|---|
| 1,209,362 | 12/1916 | Turner | 279/1 A |
| 1,582,445 | 4/1926 | Bonder | 279/1 A |
| 2,345,750 | 4/1944 | Hohwart | 279/102 |
| 2,624,102 | 1/1953 | Green | 279/102 |
| 2,794,898 | 6/1957 | Gibson | 219/75 |
| 3,075,066 | 1/1963 | Yenni et al. | 219/146.21 |
| 3,102,949 | 9/1963 | Browning et al. | 219/145.1 |
| 3,141,953 | 7/1964 | Browning | 219/146.21 |
| 3,198,932 | 8/1965 | Weatherly | 219/145.1 |
| 3,219,793 | 11/1965 | Mahoney | 219/75 |
| 3,223,428 | 12/1965 | Walker | 279/1 A |
| 3,340,718 | 9/1967 | Heisler | 219/145 |
| 3,390,292 | 6/1968 | Perugini | 219/75 |
| 3,394,242 | 7/1968 | King | 219/75 |
| 3,450,926 | 6/1969 | Kiernan | 219/75 |
| 3,639,161 | 2/1972 | Trattner et al. | 219/145 |
| 3,674,978 | 7/1972 | Becker et al. | 219/121 P |
| 3,917,148 | 11/1975 | Runyon | 228/54 |
| 3,976,852 | 8/1976 | Van Horn | 219/75 |
| 3,976,853 | 8/1976 | Trattner et al. | 219/75 |

FOREIGN PATENT DOCUMENTS 1464023 12/1966 France ...................................... 219/75

Primary Examiner—B. A. Reynolds
Assistant Examiner—Clifford C. Shaw

[57] ABSTRACT

A welding electrode for a TIG welding torch has a short disposable electrode tip attached to a holder. The holder, which is solid and made of a highly conductive material such as copper, carbon, steel, or graphite, is mounted in the chuck or collet of a conventional torch. The tip is made from a standard electrode material, such as tungsten, and is preground to a precise point angle. In the preferred form of the invention, the holder includes a collet assembly in which the electrode tip is removably held. In other forms of the invention, the tip may be permanently attached to the holder by mechanical engagement of the tip in an end of the holder or by cementing, welding or brazing the tip to the end of the solid conductive holder. In this form, tips may be attached on both ends of the holder. The holder with the attached prepoint tip reduces unnecessary wastage of the electrode material, eliminates the grinding of points in the electrode and the resulting electrode contamination, and redcuces $I^2R$ heating by increasing the electrical conductivity of the electrode.

11 Claims, 7 Drawing Figures

WELDING TIP

BACKGROUND OF THE INVENTION

This invention relates to electrodes for electric arc welding, particularly to construction of such electrodes.

In tungsten inert gas (TIG) arc welding, tungsten electrodes are used in a gas shield atmosphere. The electrodes are conventionally made of solid tungsten or related material. However, the use of these solid tungsten electrodes has resulted in serious tungsten wastage.

One source of tungsten wastage has been in shortening standard length electrodes. Tungsten electrodes are generally purchased in standard lengths of approximately 6 or 7 inches long to take advantage of economies of using longer length electrodes. However, such longer length electrodes do not fit torches with short back caps, which must be used where accessibility to the weld area is limited. This requires the user to break the standard length electrode into the length of approximately 2 inches to fit the torch. In so doing, the user commonly uses a readily available tool, such as pliers or a bench vise. In attempting to break off proper length of the electrode, the brittle electrode material can shatter into a number of unusable short pieces of less than an inch long or can split along its length, and split electrodes cannot be used since the split would cause unstable and erratic arc action.

Tungsten wastage also occurs in torches in which a standard length electrode can be employed, such as torches having a long back cap. With these torches the user is periodically required to provide a fresh point to the electrode if the electrode has been contaminated by touching the workpiece. Often, the user again uses pliers and similar tools to break away the contaminated section. While only about ¼ inches of the electrode need be removed, the user in many cases invariably breaks away a piece of at least 1 inch resulting in unnecessary wastage. In addition, tenaciously adhering metal vapors are often deposited on the electrode periphery behind the point during welding. This contamination may require pieces of up to an inch or more in length to be broken off before an uncontaminated portion of the electrode is reached.

Tungsten wastage also results from the attachment of the electrode to the torch. When a standard length electrode is used, the loss of the usable tungsten electrode portion in the stub attached to the torch can be as much as 1¼ to 1¾ inches in length because of the chucking limitations of most conventional TIG torches.

Other problems of prior art tungsten electrodes arise when the electrode must be pointed. After breaking off a contaminated section, the user must grind a new point on the electrode in the case of DCSP welding (or a squared end in the case of AC welding). Also new tungsten electrodes which are commonly shipped with a squared end for AC welding require pointing for DCSP welding. This pointing or repointing is often done on a general purpose grinding wheel, the surface of which has been contaminated by grinding other objects such as tool bits. The contaminants from the grinding wheel can be transferred to the pointed surface on the tungsten electrode, and these contaminants on the electrodes can cause electrode spitting and erratic arc action. Spitting results in tungsten inclusions in the weld which provide unacceptable results since these inclusions adversely affect weld joint strength.

It has been found that an exact angle must be provided on the tungsten electrode tip in DCSP welding for proper and consistent weld penetration. Yet, it is impossible for the operator without accurate measuring to achieve the proper and required point angle while grinding.

The electrodes of the present invention, however, reduce the difficulties indicated above and afford other features and advantages heretofore not obtainable.

SUMMARY OF THE INVENTION

It is among the objects of the present invention to provide an efficient welding electrode for a TIG welding torch which reduces the serious and unnecessary tungsten wastage of prior art electrodes.

Another object is to avoid the necessity of breaking off pieces of the electrode and repointing tips, by providing an electrode with a disposable electrode tip which is factory preground to a precise point angle with absolute assurance that there is no point surface contamination.

Still another object is to increase the electrical conductivity of the electrode and reduce the $I^2R$ heating effect of the welding current by providing an electrode primarily composed of a highly conductive material, such as copper, carbon, steel, or graphite, for example, and having the maximum usable diameter.

Yet another object is to provide an electrode which eliminates the problems of contamination, because the disposable tungsten tip can be discarded when contaminated.

These and other objects are accomplished by the novel apparatus of this invention. According to the invention the welding electrode has a holder which is made from a solid length of highly conductive material such as copper, carbon, steel or graphite and which is mounted in the chuck or collet of a conventional TIG welding torch. A short disposable electrode tip is attached to the end of the holder. The short tip is made from a standard electrode material, such as tungsten, and is preground to a precise point angle.

In the preferred form of this invention, the holder includes a collet assembly in which the tip is removably held. To reduce tungsten wastage the electrode tips are relatively short, preferably about ⅜ inches in length, and can be disposed when worn or contaminated.

In an alternate form of this invention, the tip may be permanently attached to the end of the holder. The holder may be a solid length rod such as a rod of copper coated steel, and tungsten tips may be permanently fixed at both ends of the rod. The tips may be attached to the holder by cementing, welding or brazing, or by mechanical engagement of the tip in an opening in the end of the holder. When tips at both ends of the assembly have been used, the entire electrode would be discarded.

In another alternative form of this invention, the permanently attached tip may be a coating of tungsten on a carbon or graphite rod, the ends of which have been premachined to the proper tip angle.

DESCRIPTION OF THE PREFERRED EMBODIMENTS

Figure 1:
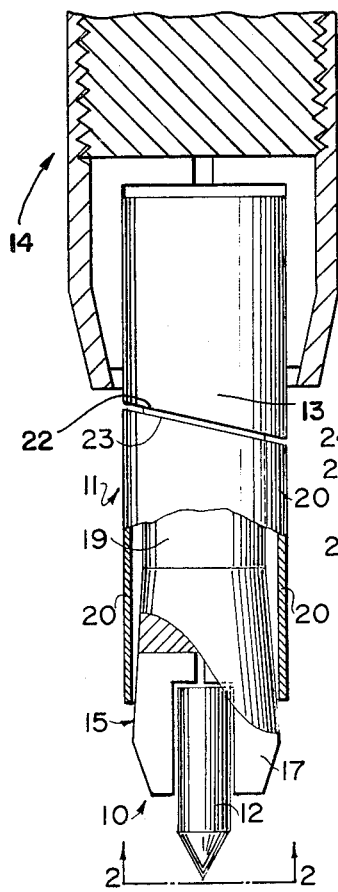
FIG. 1 is a partially sectioned side view of a welding electrode of this invention.
Figure 2:
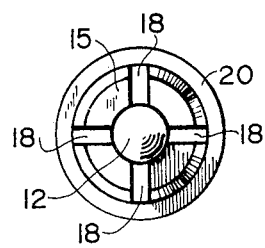
FIG. 2 is an end view of the electrode taken along line 2—2 of FIG. 1.

Referring more particularly to the drawings and initially to FIGS. 1 and 2, there is shown an electrode 10 embodying the invention and suitable for use in a TIG welding torch. The electrode comprises a generally cylindrical holder 11 and a short electrode tip 12 attached at one end of the holder. The holder 11 has an upper shank portion 13 for attachment to the chuck or collet 14 of any conventional welding torch. The tip 12 has a preformed point and is made from a conventional electrode material, such as tungsten.

In the preferred form of this invention, the holder 11 is reusable, and includes a collet assembly to provide an easy means for applying and removing the electrode tip 12. A collet 15 grips and removably holds the tip 12. The collet 15 has a plurality of fingers 17 with slots 18 (FIG. 2) therebetween. The collet 15 is attached at one end to a body member 19 which extends from the upper shank portion 13 of the holder. A tubular hollow sleeve 20 extends around the body member 19 and the attached collet 15. The collet fingers 17 are biased to project radially outwardly slightly beyond the inner edge of the sleeve 20, so that as the collet 15 is withdrawn into the hollow interior of the sleeve 20, the lower portion of the sleeve engages the collet fingers 17 forcing the fingers inwardly to securely grip the tip 12.

The lower edge of the shank portion 13 has an angled rim 22, and the upper edge of the sleeve 20 has a corresponding angled rim 23. When the sleeve 20 is rotated relative to the shank portion 12, the angled rim 22 of the shank portion engages the rim 23 of the sleeve and forces the sleeve downwardly over the collet 15, gripping the tip 12 in the collet fingers 17. To open the collet and remove the tip 12, the shank portion 13 is rotated in the opposite direction relative to the sleeve 20 so that the sleeve moves upwardly over the collet, and the collet extends from the lower end of the sleeve.

While the holder 11 is described with the upper shank portion 13 for attachment to the chuck of a conventional welding torch, it is to be understood that the holder may also be incorporated into the torch construction as a permanent part of a torch.

Figure 3:
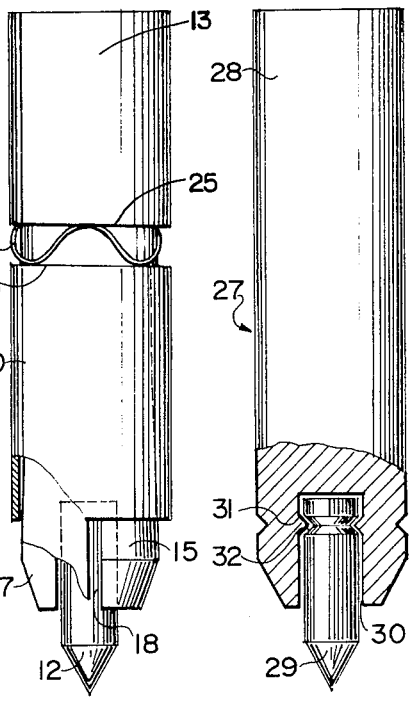
FIG. 3 is a side view similar to FIG. 1, showing a different collet assembly.

Instead of the angled rims 22 and 23, the opening and closing means of the collet assembly may employ a spring means as shown in FIG. 3. In this form, spring means such as a spring washer or a wave washer 24 is inserted between the lever lower rim 25 of the upper shank portion 13 and the level upper rim 26 of the sleeve 20. To open the collet and remove the tip 12, the user pushes the sleeve 20 upwardly, compressing the wave washer 24. Upon insertion of a new electrode tip, the sleeve 20 is released, and the washer 24 pushes the sleeve 20 back over the collet 15 to close the collet fingers 17 around the tip 12.

In addition to the disclosed collet constructions of FIGS. 1 and 3, it is contemplated that other known collet designs could be advantageously employed. For example, a threaded connection could be provided between the sleeve 20 and the shank portion 13

Figures 4, 5:
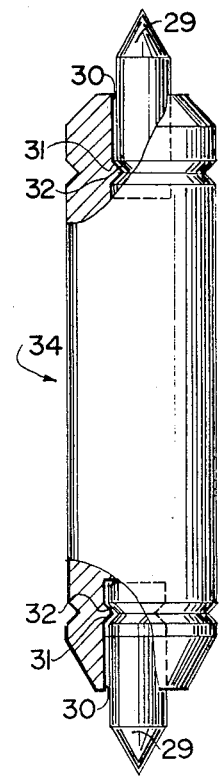
FIG. 4 is a partially sectioned side view of another electrode showing an alternative form of this invention in which the tip is permanently attached to the holder by mechanical engagement.
FIG. 5 is a side view of an electrode similar to that of FIG. 4, but with tips at both ends of the holder.

In an alternative embodiment of this invention, the tungsten tip can be permanently fixed to the holder. In FIG. 4, the holder 27 is a generally cylindrical rod comprising a length of conductive material, preferably copper coated steel. The upper shank portion 28 is suitable for locking into the TIG torch. At the other end of the holder 27, a tungsten electrode tip 29 is mounted in an opening 30 in the holder. The opening 30 has an interior circumferential ridge 31 which engages a corresponding exterior groove 32 in the upper portion of the tip 29. The tip 29 is inserted into the opening and is captured therein. After the electrode has been worn or contaminated, the entire assembly including the relatively inexpensive holder 27 is discarded. Since the diameter of the holder is larger than that of the tungsten electrode tip 29 and since the holder is copper coated, the resistance offered to the flow of welding current is equal to or less than that of an equivalent length of a conventional solid tungsten electrode as measured between the attachment to the torch and the end of the tip. It is to be understood that materials other than copper-clad steel may also be employed for the holder 27.

Using the design of the alternative embodiment of FIG. 4, it is further possible to attach tips 29 to both ends of the holder as shown in FIG. 5, wherein a holder 34 has openings 30 at each end of the holder. A tungsten tip 29 is inserted into each of the openings 30 and is captured and permanently held therein by engagement of the circumferential ridge 31 of each opening 30 engaging the groove 32 in the tip 29. With this double tipped electrode, when one tip end has been used, the holder 34 can be reversed to provide a fresh tip. When both ends have been used, the entire assembly can be discarded.

Figure 6:
FIG. 6 is a fragmentary side view of an electrode showing another alternative form of this invention in which the tip is permanently attached to the holder by other means such as welding, brazing or cementing.

Instead of the mechanical engagement of the tip in an opening of the holder, the tungsten tip may be permanently attached to the holder by other means, as shown in FIG. 6. A tungsten tip 36 is permanently attached at a joint 37 to a holder 38 comprising a cylindrical rod of highly conductive material such as carbon, graphite, steel or copper. The attachment at the joint 37 may be by means of any suitable known processes such as high temperature brazing or weld processes such as defusion bonding. The tip 36 can also be cemented in place using a high temperature carbon cement. Alternatively, the tip may be formed using known powdered metal type processes in which a composite rod from powders of tungsten and carbon or graphite could be formed such that one or both ends of the carbon or graphite rod would be tipped with the tungsten. A tip 36 can be attached at each end of the holder 38, so that the entire electrode assembly would be discarded after both tips have been consumed.

Figure 7:
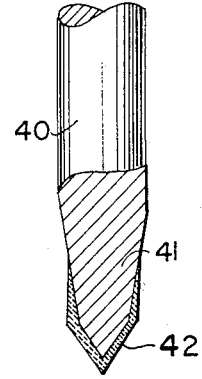
FIG. 7 is a fragmentary side view of an electrode showing still another alternative form in which the tip is a coating of tungsten material on a prepointed end of the holder.

In another alternative form of this invention, the tungsten tip may be formed by coating a prepointed end of the holder, as shown in FIG. 7. A holder 40 has a prepointed cap 41 over which a heavy layer of tungsten is deposited to form a tip 42. The cap 41 of the holder is premachined to the proper tip angle. A pointed cap 41 can be formed at each end of the holder 40, and a tip 42 applied over each cap, in which case the complete electrode assembly would also be discarded when both ends have been used. The thickness of the tungsten tip is sufficient to perform functionally. The layer of tungsten forming the tip 42 could be applied by using any known process, such as metal vapor deposition processes or electroplating processes, or by using powdered metal type processes.

In each of the forms of this invention, different size holders would necessarily be used for each electrode diameter, and the diameter of the holder may be any of those in the range of electrode diameters commonly used with TIG welding torches, i.e. 0.02 to 0.25 inches. However, the advantages of the holder are not limited to these diameters, and the invention would work equally well with diameters beyond this range. In each particular application, the holder has the maximum usable diameter so as to minimize $I^2R$ heating effects on the electrode. For this reason, the holder diameter is larger than that of the tungsten tip. The length of the holder should generally be approximately 1¼ inches so as to fit all standard torches including those with short back caps. The electrode tip can be relatively short, such as approximately ⅜ inches in length, so that a minimum amount of tungsten material is used. The tip has been factory ground to a precise point angle with absolute assurance that there is no point surface contamination.

Although tungsten is described as the electrode material herein, it is to be understood that alloys of tungsten can be used as well as chemically pure tungsten. There are also many other refractory materials with high melting temperatures and good electrical emissivity that can be employed as an electrode material.

As standard electrodes are customarily color coded by coloring one end to indicate the particular chemistry of the electrode material, the electrode of this invention can be similarly color coded as to type. However, since point grinding is not necessary, this invention eliminates the possibility of the user inadvertently grinding the point on the color coded end, thereby losing the identification of the electrode and possibly using an improper electrode type which could produce undesirable results, such as tungsten inclusions in the weld puddle from using a pure tungsten electrode in a high current density DCSP application.

While the invention has been shown and described with respect to specific embodiments thereof, these are intended for the purpose of illustration rather than limitation, and other variations and modifications will be apparent to those skilled in the art all within the intended purpose and scope of the invention. Accordingly, the patent is not to be limited in scope and effect to the specific embodiments herein shown and described nor in any other way that is inconsistent with the extent to which the progress in the art has been advanced by the invention.

What is claimed is:

1. A welding assembly for a TIG welding torch comprising:
    an electrode holder; and
    an electrode that extends forwardly relative to said torch whereby a welding arc may be established between said electrode and a workpiece for accomplishing a welding operation and which comprises
    a solid, highly conductive tip holder with a length of about 1¼" prior to use capable of being removably and releasably mounted in the electrode holder and having a rearward end portion received in the electrode holder and a forward end portion extending outwardly beyond the electrode holder and
    a short-length disposable, nonconsumable tungsten electrode tip with a length of about ⅜" prior to use preground to a precise point angle and attached to the forward end portion of the tip holder, the tip being located forwardly of and spaced entirely beyond the forward extension of the electrode holder,
    said electrode being located for access externally of said torch whereby the quantity of tungsten utilized in the electrode is minimized and after deterioration of the tip, replacement can be accomplished without disassembly of said torch by placing a new electrode with the preground tip in the electrode holder without requiring in situ cutting and grinding of a new tip from a length of tungsten rod.

2. A welding assembly as defined in claim 1, wherein the tip holder includes a collet assembly and the tip is removably held in said collet assembly.

3. A welding assembly as defined in claim 1, wherein the tip is permanently attached to the tip holder.

4. A welding assembly as defined in claim 3, wherein the tip is held by mechanical engagement in an opening in the end of the tip holder.

5. A welding assembly as defined in claim 3, wherein the tip is cemented to the end of the tip holder.

6. A welding assembly as defined in claim 3, wherein the tip is welded to the end of the tip holder.

7. A welding assembly as defined in claim 3, wherein the tip is brazed to the end of the tip holder.

8. A welding assembly as defined in claim 3, wherein the tip is a portion of the end of a composite tip holder formed by a powdered metal type process.

9. A welding assembly as defined in claim 1, wherein the tip comprises a heavy coating of electrode material on a prepointed end of the tip holder.

10. A welding assembly as defined in claim 1, wherein the electrode comprises in addition a second electrode tip preground to a precise point angle and attached to and externally projecting from the other end of the solid tip holder.

11. A welding assembly for a TIG welding torch comprising:
    an electrode holder having a primary gripping assembly, and
    an electrode that extends forwardly relative to said torch whereby a welding arc may be established between said electrode and a workpiece for accomplishing a welding operation and which comprises
    a solid, highly conductive tip holder with a length of about 1¼" prior to use capable of being held by said primary gripping assembly and having a secondary gripping collet assembly, the tip holder having a rearward end portion received in the electrode holder and a forward end portion extending outwardly beyond the electrode holder and
    a short-length disposable, nonconsumable tungsten electrode tip with a length of about ⅜" prior to use preground to a precise point angle and being removably and releasably attached to the tip holder by insertion into the secondary gripping collet assembly, the tip being located forwardly of and spaced entirely beyond the forward extension of the electrode holder, said electrode being located for access externally of said torch, whereby the quantity of tungsten utilized in the electrode is minimized and after deterioration of the tip, replacement can be accomplished without disassembly of said torch by removing the old electrode from the electrode holder and placing a new electrode with a preground tip in the electrode holder without requiring in situ cutting and grinding of a new tip from a length of tungsten rod.

* * * * *